Oct. 11, 1938. E. H. SIELING 2,133,178
COFFEE MAKING DEVICE
Filed Jan. 11, 1937
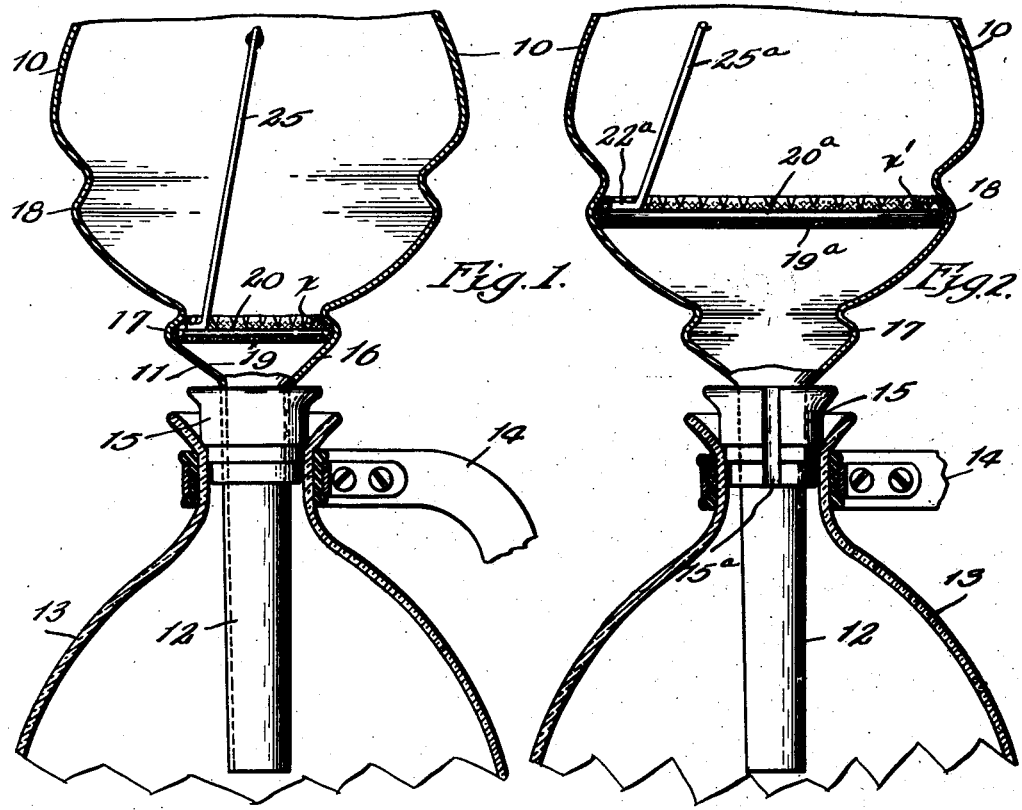
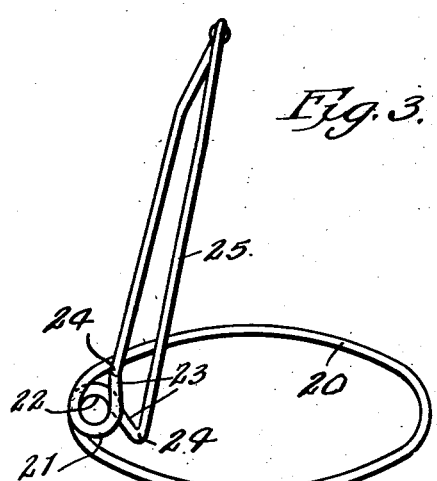
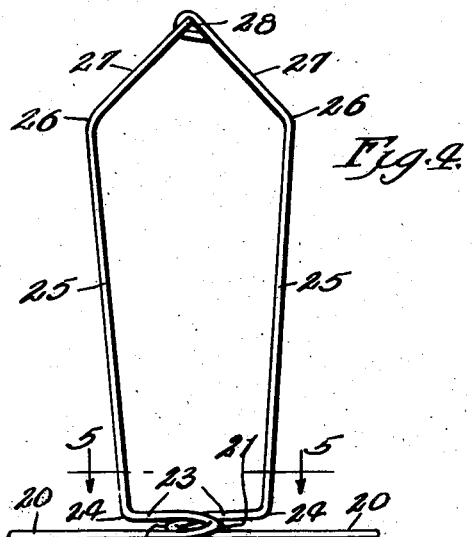
Inventor:
EDWARD H. SIELING
BY Patented Oct. 11, 1938

2,133,178

UNITED STATES PATENT OFFICE 2,133,178

COFFEE MAKING DEVICE

Edward H. Sieling, Chicago, Ill.

Application January 11, 1937, Serial No. 119,995

3 Claims. (Cl. 210—162)

My invention relates to coffee-makers or coffee-brewers of the type employing an upper bowl member having a pendent spout that enters the neck of and extends down into the lower bottle-like container.

Certain of these devices are known as vacuum coffee-makers on account of the method of operation in brewing the coffee, and it is one of the objects of my invention to provide instrumentalities whereby a vacuum coffee-maker may be readily converted into a device for making coffee by the "drip" method. In the use of my invention the coffee may be made by either of the methods above mentioned. One of the instrumentalities employed in my combination coffee-maker is a unique filter structure that embodies a strainer element and a novel retainer member for holding the strainer in desired relation to the bowl. The retaining member is shaped in a manner that permits the strainer to be readily assembled upon it or to be removed therefrom and when assembled the structure may be quickly and easily seated in its proper place in the upper bowl.

The primary object of my invention is to provide an apparatus that is capable of operating in the manner herein set forth to accomplish the purposes for which it has been designed, and to do this in an effective and dependable manner. Other objects are to provide a coffee-maker that is novel in construction; compact in the design and assemblage of the parts comprised in its make-up; dependable in operation; simple and sturdy in the formation of its parts so that it will not readily get out of order; easy to manipulate and operate; and which is economical to manufacture so that it may be sold to the user for a reasonable retail price. Numerous other objects and advantages will be apparent to persons skilled in the art after the construction and operation of my invention is understood from the following disclosure.

I prefer to accomplish the objects of my invention and to practice the same in substantially the manner hereinafter fully described and as more particularly pointed out in the appended claims. The accompanying drawing is referred to for a better understanding of the construction and operation of my invention.

In the drawing:

Figure 1 is a fragmentary elevation partly in section and illustrating the manner of using the structure for making coffee by the "vacuum" method.

Figure 2 is a view similar to Figure 1 and illustrating the manner of using the structure for making coffee by the "drip" method.

Figure 3 is a view in perspective of the retainer spring for mounting the strainer.

Figure 4 is a vertical elevation of the spring.

Figure 5 is a fragmentary plan of ringlike lower portion of the spring, taken on line 5—5 of Figure 4.

The drawing is somewhat schematic for the purpose of showing a typical or preferred embodiment of my invention, and in said drawing similar reference characters are employed to identify like parts wherever such parts appear in the different views.

Referring to Figures 1 and 2 it will be seen the structure embodies an upper bowl-shaped member 10 having a wide opening at its top and a central somewhat restricted discharge opening 11 in its bottom that communicates with an elongated tubular spout 12, depending from the bowl, that is removably inserted into and through the restricted neck or throat of the lower bottle-like container 13. A suitable hand-grip 14 embraces the neck of the container 13 for convenience in handling the structure, and a suitable gasket 15 surrounds the upper portion of the spout to provide an air tight seal with the neck of the lower container during the brewing of coffee by the vacuum method.

Above the discharge opening 11 the wall of the bowl flares outwardly in funnel shape as indicated at 16 towards the top of which an annular outwardly extending bead is formed which affords a seat 17 for one of the filters hereinafter described in detail. The outward flare of the bowl wall is continued above the seat to a trans-axial plane approximately one-third the height of the bowl where said wall is given a somewhat ogee-shape in cross-section to provide a second annular seat 18 for the other of the filters hereinafter described. Beyond and above the ogee formation the bowl wall in cross-section bulges outward and upward and then extends in a wide slightly inward curve to its open top.

The strainers and their retainers are of substantially the same formation with exception that they are of different sizes or dimensions. The smaller strainer structure which is mounted in the seat 17 embodies a fabric disk 19 the circular marginal portion of which may be provided with a pull string for drawing the edge inwardly or may be stitched on a puckering machine, both methods tending to shape the fabric into a shallow cup-like member with an inwardly extending edge or lip x. Although not indicated in the drawing it is preferred to utilize two plies of flannel in assembling the strainer and to dispose them with their soft downy surfaces towards each other so that the mesh or fabric surfaces are outermost.

The means for removably mounting the strainer in its seat 17 is a wire holder shown in detail in Figures 3, 4, and 5. A piece of wire is shaped, intermediate its ends, into a split ring 20 with the end portions of the ring overlapped a suitable distance as at 21. Reverse, or hairpin, bends 22 are then made in the wire so that short arms 23 are provided extending tangent to the bends, and at the outer ends of these arms the wire is given sharp angular bends or breaks 24 to dispose the remaining end portions 25 of the wire upright, or substantially upright, to provide suitable grips for operating the device. Oppositely disposed oblique bends 26 form converging terminals 27 at the upper portions of the grips 25 and bring the ends of the wire together where they are linked to each other by interlocking eyes 28. It will be seen the arms 23 extending oppositely past each other from the reverse bends 22 are well within the circumference of the ring 20 to thereby dispose the upstanding grips 25 in off-set relation inside the ring, and the portions of the device from the sharp breaks 24 up to the eyes 28 incline inward toward the axis of the ring to position the grips near the center of the bowl and remote from the walls thereof. Also the portions 21, the reverse bends 22 and the arms 23 are quite flat so that they are made to overlap in a smooth manner as suggested in Figures 3 to 5. The overlapping of the parts does not interfere with their easy movement but rather assists in guiding them during contraction or expansion of the spring ring, and the lateral arms 23 at the lower ends of the grips are free and unsecured, and thus avoid the employment of guiding elements which inherently tend to bind if the wire becomes distorted or pressure on the grips is exerted in a sudden manner. Thus the lower ends of the grips may be moved past each other to materially reduce the ring dimensions.

To mount the strainer on the holder, the grips 25 are pressed towards each other to reduce the dimensions of the ring so that it may be inserted through the puckered portion or lip of the strainer, after which the pressure on the grips is released and the ring assumes its normal or substantially normal dimensions. The strainer and holder may readily be placed in the seat 17 by slightly contracting the ring 20 by means of the grips 25 until the desired position is secured and upon release of the grips the ring will expand radially into the widest portion of the seat. The ring at all times acts as a spreader for the cup-like strainer and assists in removal of the latter from the bowl.

As before stated, the structure for the upper wider seat 18 corresponds with that just described except that the dimensions and the gauge of the wire are larger than in the previously described structure. In Figure 2 the split ring 20a expands the cloth strainer 19 and its reverse bends 22a terminate in overlapped arms within the circumference of the ring to off-set the upwardly extending grips 25a. The strainer 19a of larger diameter than strainer 19 has a puckered lip x to shape it in a cup-like manner. When this larger structure is used in the upper seat 18 the coffee is brewed by the drip method which contemplates the pouring of boiling water over the ground coffee that had previously been placed upon the strainer, and, in order to prevent formation of a vacuum in the lower container a gasket having one or more longitudinal grooves or channels 15a is substituted for the ungrooved gasket employed in the first-described arrangement.

The provision of a channeled or grooved gasket, such as shown in Figure 2, permits the user to regulate the time required to brew the coffee when using the drip method because the channels control the out-flow of air from the lower container and consequently regulate the speed with which the water trickles through the strainer and the ground coffee thereon. It is of course feasible to use a channeled gasket of soft rubber so that it may be forced into the neck of the container different distances thereby producing different degrees of constriction of the channel. It will be understood the bowl and the container may be produced from glass, metal, porcelain or any other suitable material. The strainer fabric may be a single ply or several plies superposed upon each other depending upon the choice of the user.

With the present structure the coffee may be readily prepared by either of the methods described according to the desire of the person preparing the same, and it is therefore unnecessary to have on hand the two different types of coffee-pots. The parts of the strainer structures are made in a manner that permits utmost freedom of movement of the parts without liability of binding when being compressed or expanded. The specially constructed gasket interposed between the spout and the downwardly tapered wall of the bottle-neck of the lower container permits the user to nicely control the flow of fluid through the strainer and thus regulate the speed of the "drip" method in order that the coffee may be weak, medium or strong according to the particular taste of the consumer.

What I claim is:

1. As an article of manufacture, a retainer device embodying a split ring, the end portions of said ring having oppositely facing semi-circular bends extending into the confines thereof in overlapping relation to each other, short arms disposed tangent to the free ends of said bends and extending in opposite directions away from each other to lie alongside adjacent portions of said ring, said arms and bends providing U-shaped flat loops that are movable independently of each other and all portions of which are free from interlocking relation, and finger-grips at the ends of said arms opposite said bends, each grip disposed adjacent that portion of the ring at which its respective loop is formed.

2. As an article of manufacture, a retainer embodying a length of wire the intermediate portion of which is formed into a split ring, the remaining portions of the wire formed into flat reverse bends extended inwardly at the ends of the ring and having tangent portions disposed alongside the said ring, the free ends of said tangent portions being relatively close to respective end portions of the ring formed with the respective reverse bend, and upstanding finger-grips at the free ends of said tangent portions.

3. As an article of manufacture, a retainer device embodying a length of wire the intermediate portion of which is formed into a split ring, the remaining portion of the wire at one end of the ring formed with a flat reverse bend extended into the ring and having an inner tangent arm alongside the ring with its free end adjacent the respective end of the ring; the other remaining portion of the wire at the other end of the ring formed with a flat reverse bend extended into the ring and having an inner tangent arm alongside the ring with its free end adjacent the respective end of the ring; said reverse bends and tangent arms providing superposed loops all portions of which are free from interlocking relation with each other; and upstanding finger-grips at the free ends of said tangent arms.

EDWARD H. SIELING.